July 7, 1925.

J. M. BENJAMIN

Re. 16,106

NAIL DISTRIBUTING MACHINE

Original Filed July 11, 1918 4 Sheets-Sheet 1

INVENTOR—

John M. Benjamin

By his Attorney,

Nelson W. Howard

July 7, 1925.

J. M. BENJAMIN

Re. 16,106

NAIL DISTRIBUTING MACHINE

Original Filed July 11, 1918 4 Sheets-Sheet 2

INVENTOR—

John M. Benjamin

By his Attorney

Nelson W. Howard

July 7, 1925.

J. M. BENJAMIN

Re. 16,106

NAIL DISTRIBUTING MACHINE

Original Filed July 11, 1918 4 Sheets-Sheet 3

INVENTOR—
John M. Benjamin
By his Attorney
Nelson M. Howard

July 7, 1925.

J. M. BENJAMIN

Re. 16,106

NAIL DISTRIBUTING MACHINE

Original Filed July 11, 1918 4 Sheets-Sheet 4

INVENTOR—

John M. Benjamin
By his Attorney,
Nelson W. Howard

Reissued July 7, 1925.

Re. 16,106

UNITED STATES PATENT OFFICE.

JOHN M. BENJAMIN, OF BEVERLY, MASSACHUSETTS, ASSIGNOR TO UNITED SHOE MACHINERY CORPORATION, OF PATERSON, NEW JERSEY, A CORPORATION OF NEW JERSEY.

NAIL-DISTRIBUTING MACHINE.

Original No. 1,342,415, dated June 8, 1920, Serial No. 244,399, filed July 11, 1918. Application for reissue filed May 27, 1922. Serial No. 564,250.

*To all whom it may concern:*

Be it known that I, JOHN M. BENJAMIN, a citizen of the United States, residing at Beverly, in the county of Essex and State of Massachusetts, have invented new and useful Improvements in Nail-Distributing Machines, of which the following is a specification.

This invention relates to nail distributing machines and is illustrated as embodied in mechanism organized to handle headed or collar nails.

The common forms of nails known as collar nails and headed nails are easily and accurately handled in raceways in which they are supported by their enlarged portions, that is, by their collars or heads, in substantially vertical position, point downward. In many machines to which it is desirable to supply such nails automatically, the nails must be delivered to the machine in the reverse position, that is to say, point upward. A feature of the present invention, accordingly, consists in the combination with a nail raceway, of a member, for example a distributer cylinder, for distributing nails received from the raceway, and means for receiving nails from the raceway, inverting them, and delivering them to the distributer cylinder. The nail inverting means may conveniently consist of a distributer disk interposed between the raceway and distributer cylinder and rotating about a horizontal axis in such a way that a nail may be received from the raceway point first in a suitable passageway in the disk and delivered from the said passage to the cylinder head first.

In this connection, a further important feature of the invention consists in the provision of a plurality of raceways, which may contain nails of different sizes or lengths, in combination with a corresponding number of distributer disks arranged to receive nails from the respective raceways and deliver them as a single load to a single distributer cylinder.

Another feature of the invention resides in the provision of novel means for variably predetermining the number of nails to be delivered from the raceway. By the utilization of this feature, it becomes possible to deliver to the distributer cylinder any predetermined number of nails that may be desired to constitute the load eventually to be delivered. When a plurality of raceways are provided, it becomes possible to predetermine separately the number of nails to be delivered by each individual raceway, and consequently a load can be produced which will contain nails in any desired numbers and arrangement as to length or size. The number of nails to be delivered from a raceway, as for example in a single rotation of the distributer disk, may advantageously be predetermined and controlled by the provision of means such, for example, as a separator responsive to the movement of the disk, or equivalent rotary operating means, for delivering a predetermined number of nails during each rotation of said means. It is desirable that provision be made for predeterminately varying the number of nails thus delivered and means for securing this result are, accordingly, provided by the present invention. More specifically, in the particular embodiment of the invention herein shown and described, the nail separator is operated by an actuator having a plurality of pins arranged to impart a series of movements to the separator, and cam, or other suitable means may, if desired, be provided for facilitating placing any desired number of said pins in operative position.

It is convenient to deliver nails from the raceway to the distributer member by gravity, and a bent or misshapen nail is liable not to enter completely into the passageway in the distributer member, but to remain projecting more or less therefrom. In order to prevent possible damage to the mechanism by such a projecting nail a further feature relates to the provision in the guard member which co-operates with the distributer member to retain the nails therein, of a yielding shutter to permit the passage of a projecting nail upon movement of the distributer member without endangering the mechanism of the machine.

Another feature of the invention relates to the provision, for a cylindrical member having nail guiding passages opening upon its periphery, of a detachable casing for completing the walls of the passages, which casing consists of a flexible band of thin material. This flexible band is preferably secured in place by a thumb screw or similar binding means and, consequently, may be very easily removed to afford access to the cylinder. I prefer also to mount the cylinder in such fashion that it may be easily separated or lowered away from the distributer disk when it is desired to obtain free access to the parts.

Still further features of the invention comprise means for disposing nails accurately in vertical position just prior to their delivery from the raceway and means, preferably automatic, for closing the nail passage leading to the distributer member when the parts of the machine are separated to gain access to the interior mechanism.

Other more or less important features of the invention will become apparent upon reading the following detailed description of the practical embodiment thereof in connection with the accompanying drawings, in which.

Figure 1:
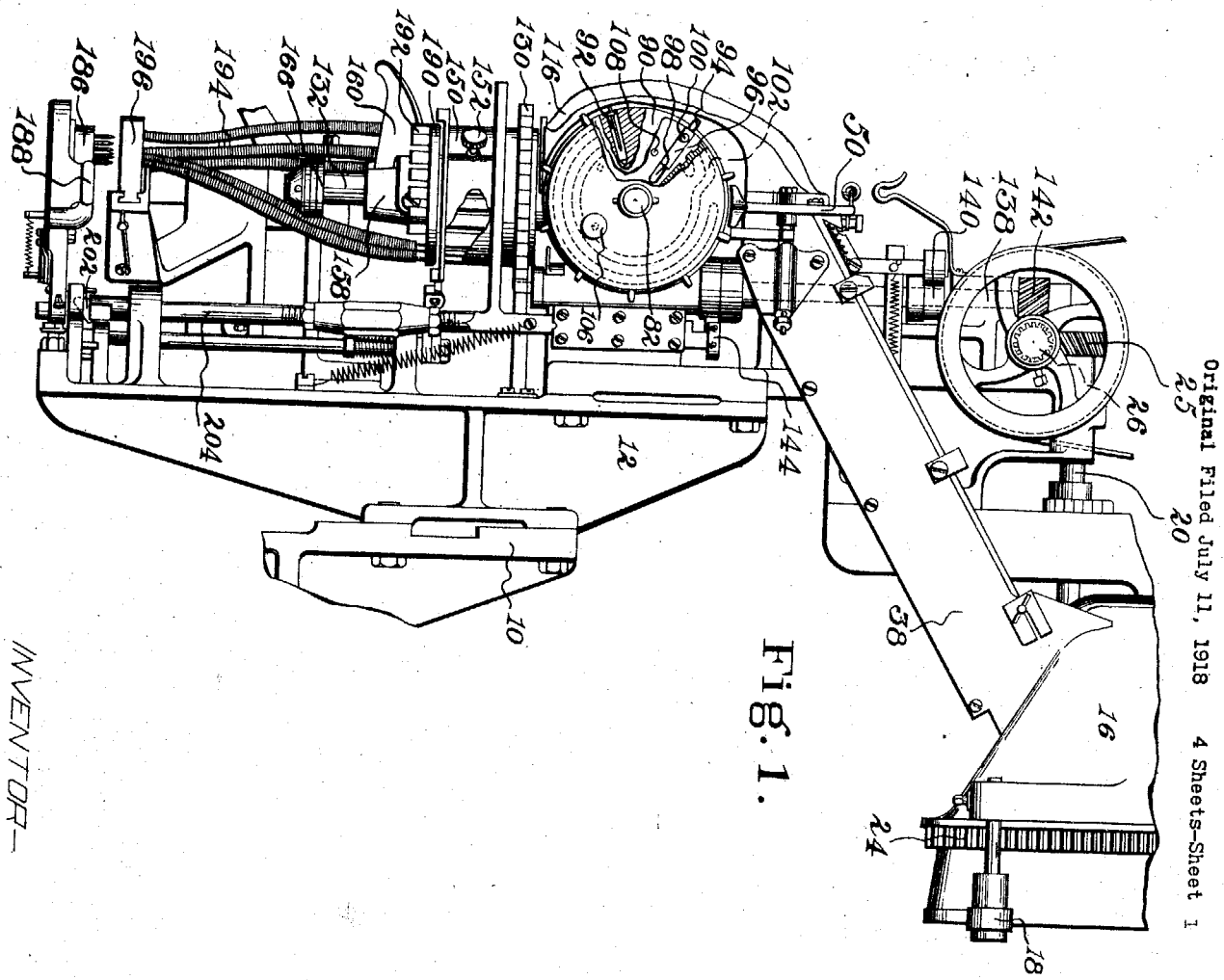
Figure 1 is a view in side elevation of a nail distributing mechanism embodying my invention.
Figure 2:
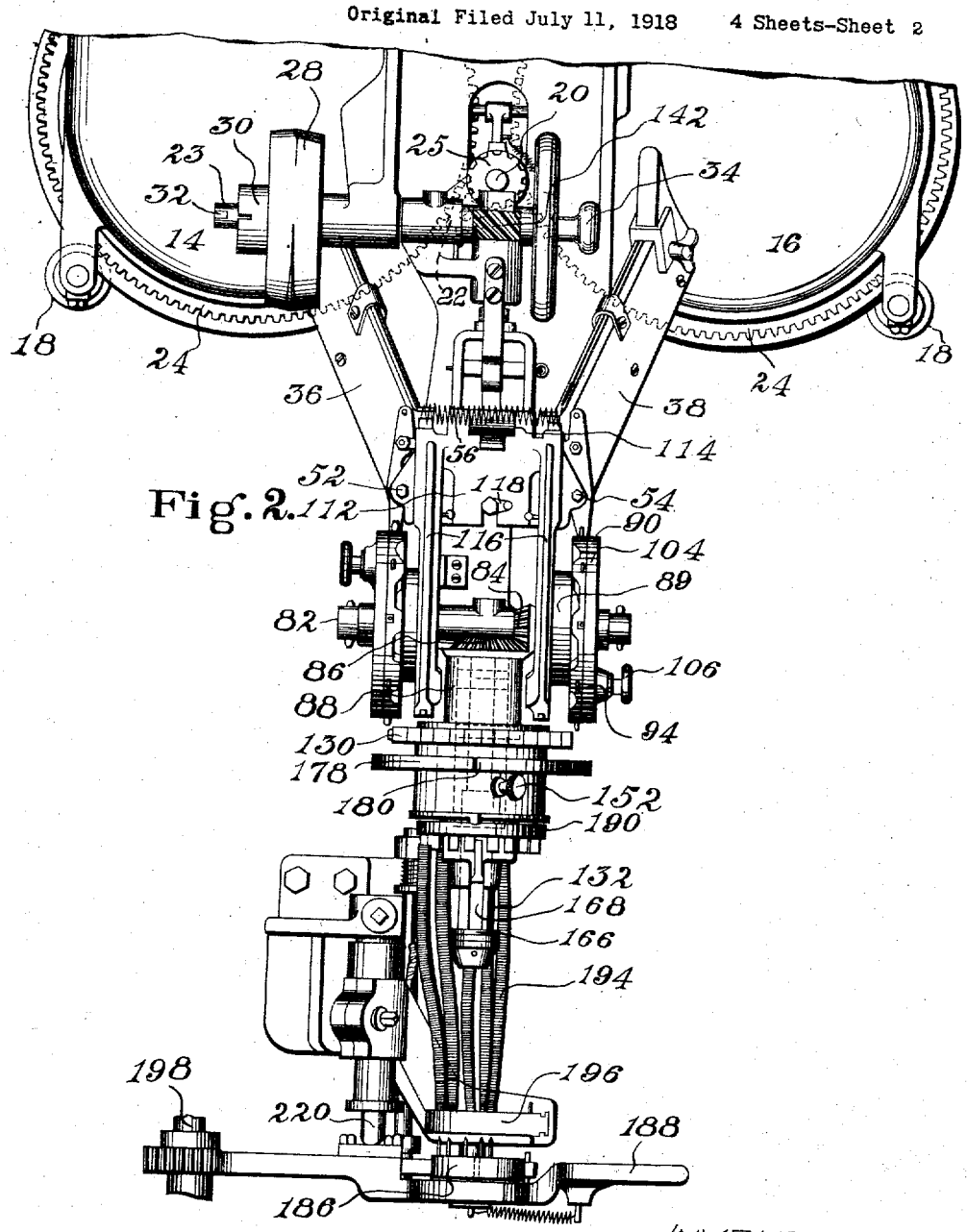
Fig. 2 is a view of the mechanism in front elevation.

Referring now to Fig. 1, 10 indicates a suitably disposed portion of the machine upon which the nail distributing mechanism is mounted. A bracket 12 bolted to the frame 10 serves to support the distributer. Two hoppers or drums 14, 16 are mounted to rotate about parallel, horizontal axes extending from front to rear, being supported and guided by rolls 18 and driven from a shaft 20 through pinions 22 meshing with gears 24 secured to the drums. The shaft 20 is driven from the main driving shaft 23 by a gear 25 mounted upon the shaft 20 and meshing with a gear 26 upon the said shaft 23. Power is received from any suitable source by a driving pulley 28, rotatably mounted upon the shaft 23 and arranged to be secured in driving engagement therewith by a clutch comprising a notched hub 30, formed upon the pulley 28, and a co-operating lug 32 upon the shaft 23, which may be engaged in the notch in the hub 30 by sliding the shaft 23 toward the right, as seen in Fig. 2, by means of a handle 34. The driving pulley 28 may run continuously, while the operation of the nail distributer may be stopped, whenever desired, by disengaging the clutch.

Figure 4:
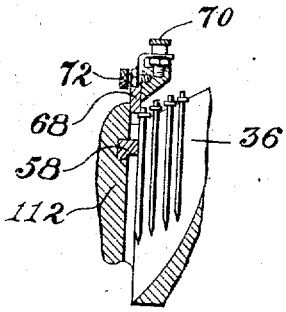

The nail drums 14, 16 may contain any suitable or usual means for feeding nails deposited therein to raceways or strippers 36, 38, respectively, wherein the nails are supported in approximately vertical position by their heads or collars, as shown in Figs. 1 and 4.

Figure 5:
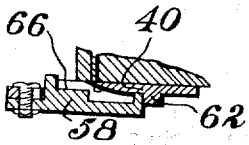

Rows of nails in the raceways or strippers 36, 38 are retained, and the nails delivered from the lower ends of the raceways, one at a time, by mechanism including separators or nail picks which will now be described. Fingers 40, 42 mounted for horizontal sliding movement in a guideway 44 in the front of the distributer frame are normally held apart and in position to close the lower ends of the raceways by a compression spring 46, and are moved toward each other against the expansive force of the spring 46 by separator levers 48, 50 pivoted at 52, 54 respectively, and drawn together by a spring 56 of sufficient strength to overcome the spring 46. The separator levers act upon the fingers through sliding links 58, 60, the angularly turned ends of which engage lugs 62, 64 upon the slides 40, 42. The sliding links 58, 60 are formed in horizontal cross section, as shown in Fig. 5, a face 66 engaging the shank of, and acting as a stop for, the lowermost nail in the raceway as the row of nails supported in the raceway descends, when the separator finger is moved to uncover the lower end of the raceway. When the separator finger and the sliding link are moved in the opposite direction to the position shown in Fig. 5, the lowermost nail is separated from the remainder of the row and allowed to drop into a distributing disk which will be described hereinafter.

In order to insure an accurate vertical position of the nail, prior to its release, a stop 68, with its acting face in vertical alinement with the surface 66 is provided. Vertical adjustment of the stop to position it properly for engagement with the head of the nail is effected by a screw 70, see Fig. 4, the adjustment being secured by a binding screw 72. It will be observed that the separator fingers are yieldingly actuated in both directions by springs, hence, there is no danger of breakage of parts of the machine, in the event of a misplaced or a misshapen nail being encountered.

As the nails are separated one by one from the lower ends of the raceways, they drop through guiding passages 74, 76 into radial holes in distributer disks 78, 80. Inasmuch as these distributer disks are alike in construction and operation, it will suffice to describe one of them in detail.

The distributer disks are mounted for rotation upon a horizontal shaft 82 which is driven by a miter gear 84, meshing with a miter gear 86 on the upper end of a vertical sleeve 88. The disk 80 is connected by a hub 89 to a separator actuator, herein shown as a parallel pin disk 90. The distributer disk 80 is provided with radial holes 92 for the reception of nails from the nail guiding passage 76. The actuator 90 is provided with a series of projecting cam members such as radial pins 94, which, as illustrated, correspond in number to the holes 92. For convenient operation of the machine, I prefer to provide an adjusting member, now to be described, for withdrawing the pins automatically. Each pin 94 is provided with a square shank 96, see Fig. 1, mounted to slide radially in a guide passage 98 formed in the disk 90, and has a pin 100 projecting from its side. The pins 100 engage in a cam groove 102 formed in the inner face of a cover disk 104 loosely mounted upon the shaft 82 to permit rotation of the cover disk relatively to the pin disk. A spring pressed pin provided with a handle 106 is mounted in the cover disk 104, and the pin disk 90 is provided with a circular series of holes 108 corresponding in number to the number of nail holes in the distributer disk 80, in any one of which holes 108 the spring pressed pin may be engaged to secure the pin disk and cover disk together against relative rotation. By withdrawing the pin 106, the cover disk may be rotated relatively to the pin disk, and the shape of the groove 102 is such that by such relative rotation the pins 94 will be successively retracted or projected, depending upon the direction of the rotation. The construction and arrangement are such that any desired number of the pins 94 may be projected from the periphery of the actuator.

Figure 3:
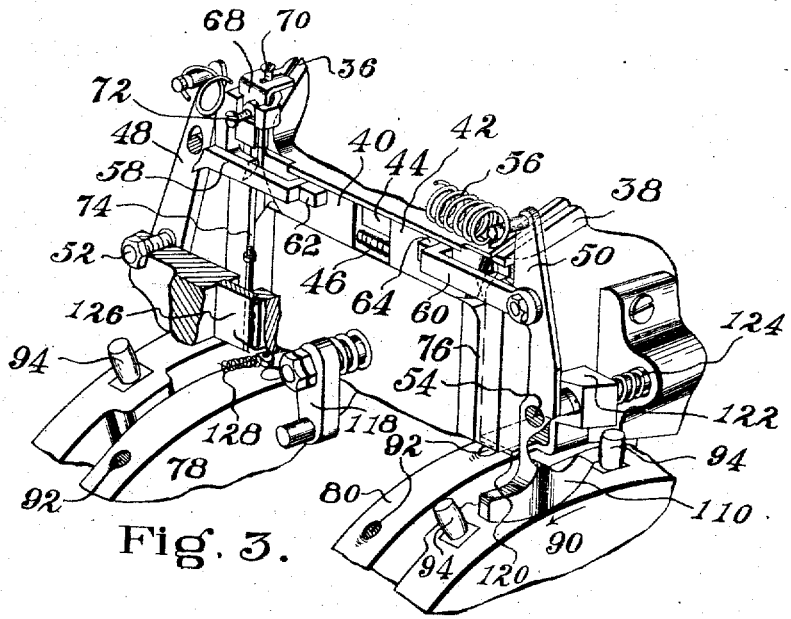
Figs. 3, 4 and 5 are fragmentary views illustrating details of the nail separators.
Figure 6:
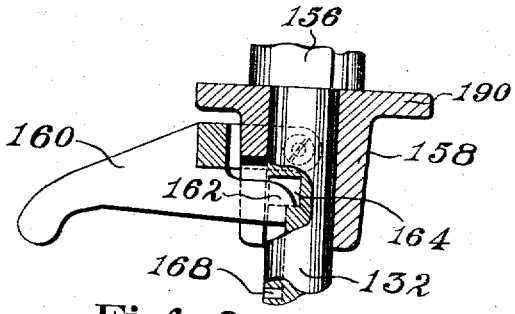
Fig. 6 shows a detail of the means for supporting the nail distributing cylinder.

Formed upon the lower end of the separator lever 50 is a cam arm 110 which normally is in position to be engaged by the pins 94 in succession as the distributer and separator disks are rotated together. These disks rotate in a direction indicated by the arrow in Fig. 3 and the upper end of the separator lever is swung outwardly by the engagement with the cam face 110 of one of the pins 94, while simultaneously the upper end of the separator lever 48 is swung in the opposite direction by the corresponding pin 94 in the actuator upon the opposite side of the machine.

The full entry of the nails into the holes 92 is insured, and their escape, during the rotation of the distributer disks, is prevented by a cover or guard member 112 hinged at 114 and provided with downwardly extending segmental guard fingers 116 embracing a portion of the periphery of the distributer disks. The guard member 112 is locked down by a button 118 (Fig. 2) which may be turned downwardly to release the guard and permit it to be swung outwardly and upwardly to obtain access to the parts of the mechanism shown in Fig. 3. The pivots 52, 54 of the separator levers are mounted in the guard member and, consequently, the said levers and their connected slides 58, 60 are also swung out of the way when the guard is lifted. A plate 120, mounted upon a sliding block 122, pressed rearwardly by engagement therewith of the pivot stud 54 is moved forwardly transversely of the nail passage 76, by a spring 124 to close the lower end of the passage when the cover or guard member is released, thus avoiding the dropping out of the nail which may be in the passage 76 at such time.

The guard member 112 is provided with shutters 126 yieldingly held by springs 128 in position to close the front of the nail passages 74, 76. In the event of a nail not dropping completely out of the passage 74, for example, into a hole 92, the shutter 126 may yield to allow the passage of projecting head of the nail when the rotation of the disk 78 starts, and the shutter will immediately snap back into closed position when the projecting nail head has passed by it. Any possibility of bending nails or breaking parts of the mechanism at this point is thus eliminated.

At the lower end of the sleeve 88 a star wheel 130 is mounted to rotate horizontally about a fixed upright spindle 132. Rotation of the star wheel is effected intermittently by engagement with the successive teeth thereof, of a pin 134 projecting from the lower face of a disk 136 driven from a vertical shaft 138 through a clutch 140. Near its upper end, the shaft 138 carries a gear 142, which is in driving engagement with the gear 26 upon the driving shaft 23. By virtue of this construction, the upper portion of the shaft 138 is continuously driven, as long as the driving shaft 23 rotates, but the lower portion of the shaft and the star wheel driving pin 134 are not operated as long as the clutch stop 144 remains in the position in Fig. 7, keeping the clutch disengaged.

Secured to and rotating with the star wheel 130 is a distributer cylinder 146 having, in its periphery, nail guiding passages 148 equal in number to the total number of holes 92 in both distributer disks 78, 80. A casing 150 surrounding the distributer cylinder completes the walls of the guide passages 148 and retains the nails therein. This casing is preferably in the form of a flexible band of thin metal, the ends of which are secured by a binding screw 152 and which may be radially removed to afford access to the nail passages by loosening the said screw. The cylinder 146 is rotatably supported upon a flange 154 at the upper end of a vertically movable, non-rotatable sleeve 156 surrounding the stationary spindle 132. The sleeve 156 is provided with a hub 158, to which is pivoted a handle 160, having an inwardly projecting dog 162 which is normally engaged in the recess 164 in the upright member 132 to support the distributer cylinder in operative position. By lifting the outer end of the handle 160, the dog 162 is disengaged sufficiently to permit the cylinder and associated parts to be lowered until the lower end of the hub 158 rests upon a collar 166 secured to the lower end of the member 132. Free access is thus afforded to the distributer cylinder for the purpose of cleaning, making adjustments, or removing jammed nails. When the cylinder is lowered, the dog 162 travels downwardly in a vertical slot 168, formed in the member 132, and rotation of the hub 158 and the sleeve 156 is thus prevented.

A shutter 170 is mounted upon the lower end of the cylinder 146 and is provided with a series of holes 172, corresponding in number to the passages 148. A limited amount of rotary movement of the shutter, relatively to the cylinder, is permitted by a screw and slot connection 174, and a torsion spring 176, connecting the shutter and cylinder, tends to turn the shutter to a position to close the lower ends of the passages 148 and to retain the nails in said passages.

Figure 7:
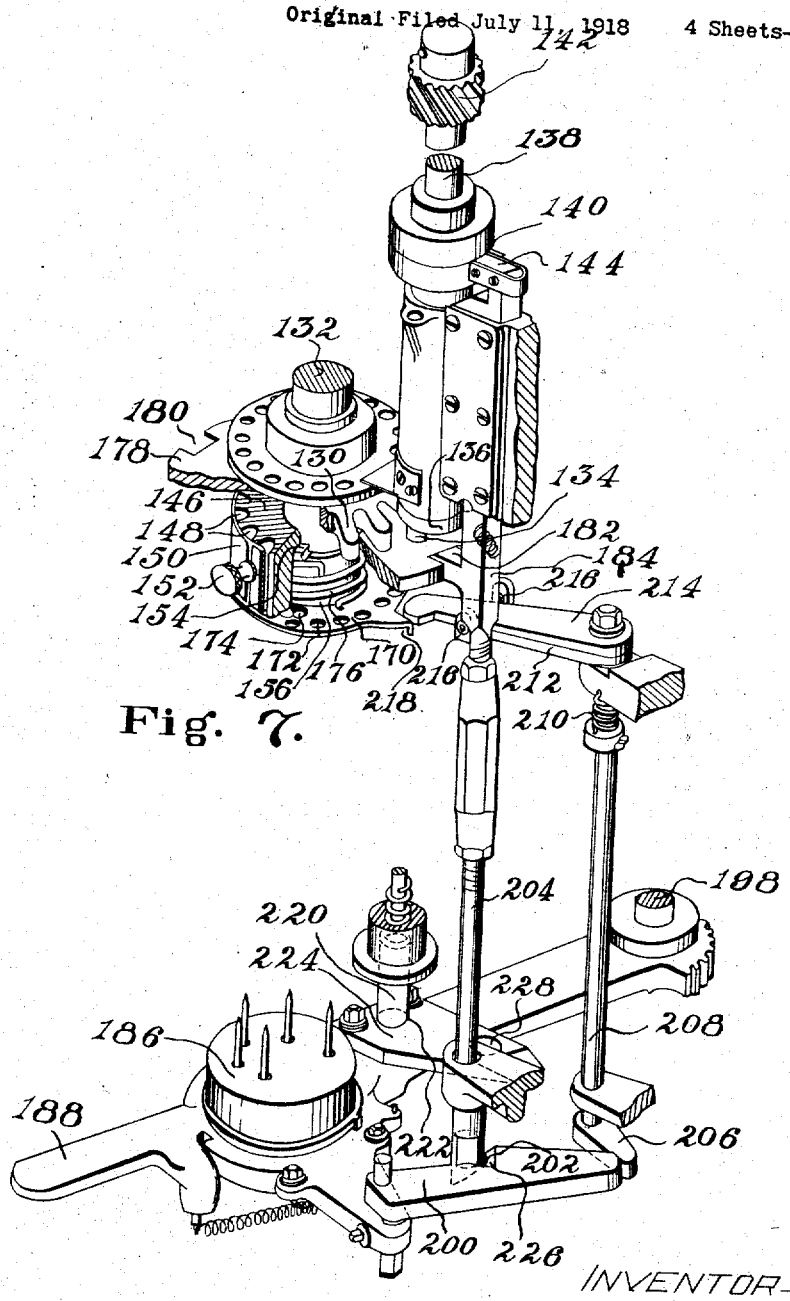
Fig. 7 is a perspective view of the driving and controlling mechanism.

A disk 178, having opposite notches 180, 180 in its periphery, is secured to the cylinder and rotates therewith. When the position of the parts is as shown in Fig. 7, a lug 182 projecting from the side of a sliding bar 184 carrying the clutch stop member 144 lies in one of the notches 180. Under these conditions, the stop member 144 maintains the clutch 140 in disengaged condition. The starting of the distributer cylinder is controlled by the nail transferrer 186 of the heel attaching or other machine, upon which the nail distributer mechanism is mounted. This nail transferrer, shown as provided with a handle 188, may be of any desired construction, a typical example being shown in United States Patent No. 884,513, granted April 14, 1908, upon the application of Benjamin F. Mayo.

Immediately beneath the shutter 170 of the distributer cylinder is a plate 190, having nail guiding holes leading to depending nozzles 192, to which may be attached flexible nail guiding tubes 194, the lower ends of which lead into holes in a foot plate 196, the said holes being disposed in the pattern in which it is desired to arrange the nails. The plate 190 is mounted at the upper end of the hub 158, partaking of the non-rotating, vertical movement of the latter when the handle 160 is released. The transferrer 186 is movable about a vertical pivot 198 from a nail delivering position to a nail receiving position beneath the foot plate 196. In such movement a trip plate 200 passes idly by a dog 202 pivoted in the lower end of a rod 204 connected to the clutch stop slide 184, the dog yielding in that direction without affecting the clutch stop. At the end of the movement of the transferrer to nail receiving position, the projecting end of the trip plate 200 engages and swings an arm 206 secured to the lower end of the vertical rock shaft 208, turning the shaft against the tension of a torsion spring 210 and swinging a shutter actuating arm at the upper end of the shaft. The shutter actuating arm consists of a member 212 rigidly secured to the shaft 208 and a member 214 resting upon the member 212 and constructed for angular adjustment about the axis of the shaft 208. This angular adjustment is effected by set screws 216, threaded into lugs projecting upwardly from the member 212, the set screws bearing against opposite edges of the member 214.

The shutter 170 is provided with two diametric downwardly turned lips 218 so disposed that one of these is closely adjacent to the end of the member 214 when the rotation of the distributer cylinder is stopped with the lug 182 in one of the notches 180. At this time it is to be assumed that the shutter is in a position to close the lower ends of the nail passages 148 and to sustain a load of nails therein. When the member 214 is swung about the axis of the shaft 208 by the engagement of the trip plate 200 with the arm 206, the end of the member 214 engages the lip 218, rotating the shutter sufficiently to bring the holes 172 into register with the nail passages 148, permitting the nails to drop from the distributer cylinder and pass through the tubes 194 into the transferrer. The variable connection between the members 212 and 214 permits accurate adjustment of the position to which the shutter is to be moved to discharge the nails.

The transferrer is held in nail receiving position while nails are being delivered to it by a spring pressed detent 220 which enters a concavity 222 in the upper surface of a plate 224 secured to the arm of the transferrer.

After the nails have been received in the transferrer, the transferrer is moved to the left, as seen in Fig. 7, to a position, where the nails are delivered to the machine which is to use them. In the initial portion of this movement, the dog 202 rides up an inclined surface 226 formed upon the trip plate 200, lifting the clutch stop 144 and permitting the clutch 140 to become engaged. The continuously running shaft 138 is thus clutched to the pin disk 136 which is set into rotation. The pin 134 engages the teeth of the star wheel 130 and effects intermittent rotation of the distributer cylinder through the space of one tooth for each rotation of the disk 136. The trip plate 200 immediately passes from beneath the dog 202, permitting the clutch stop bar 184 to drop until the lug 182 rests on top of the disk 178, the notch in which has been removed from beneath the lug by the partial rotation of the disk with the distributer cylinder. The intermittent rotation of the distributer cylinder continues until the other notch 180 in the disk 178 comes beneath the lug 182, which drops into the notch, the member 144 descending into position to disengage the clutch 140 and to stop the rotation of the cylinder.

When the load of nails has been discharged, the transferrer is returned until the detent 220 drops into a depression 228 in the plate 224 which serves to maintain the transferrer stationary until it is desired to move it again to receiving position to secure another load of nails.

The notches 180 are diametrically opposite in the disk 178, since each of the distributer disks 78, 80 delivers its complement of nails to one half of the cylinder 146, and, therefore, only half a revolution of the cylinder is necessary in order to obtain sufficient nails from the distributer disks to fill all the nail passages 148.

The operation of the mechanism is as follows: The nails to be distributed and arranged are placed in either or both of the hoppers 14, 16. If it be desired to supply nails of two lengths in each load delivered—for example, long nails for the rear of a heel and shorter nails for the breast—the nails of different lengths are placed in the two hoppers respectively. If nails all of one length are required, they may be placed in both hoppers or, if the numbers of nails to be delivered in a load does not exceed the number of holes 92, in one of the distributer disks, the nails may be placed in one hopper only. The hoppers, having been thrown into operation by engaging the clutch 30, 32, act in the usual manner to supply nails to the raceways. Each of the cover disks 104 is set to leave projecting from the periphery of its corresponding pin disk a number of pins 94 corresponding to the number of nails which it is desired to secure from the corresponding raceway and hopper, the remaining pins 94 being retracted and, therefore, inoperative to actuate the separators to deliver nails to the distributer disks. The clutch 140 being tripped by the trip plate 200, the star wheel 130 is set into rotation and the distributer cylinder 146 rotates through half a revolution. Simultaneously, the shaft 82 carrying the distributer disks 78, 80 receives, through the gears 86, 84, a complete revolution. During this revolution of the distributer disks, the separator levers or nail picks are actuated as many times as there are pins 94 projecting, delivering at each actuation a nail from the raceway or stripper through the passage 74 or 76 into the corresponding hole 92 in the distributer disk, which stops for a moment at the proper point in its movement to receive the nail. It will be apparent, from an inspection of the drawings, that the nails are delivered to the distributer disks point downward. In the continued rotation of the disks, however, the nails are inverted and drop out of the holes 92 into the passages 148 head downward, in which position they are subsequently deposited in the transferrer 186. After a complete revolution of the distributer disks and a half revolution of the distributer cylinder, the lug 182 drops into one of the notches 180, and the movement of the distributer is stopped. The desired number of nails is now contained in the distributer cylinder ready to be delivered to the transferrer when the latter is moved to nail receiving position, and the shutter 170 turned to release the nails.

Having described my invention, what I claim as new and desire to secure by Letters Patent of the United States is:

1. In a nail distributing machine, the combination of a plurality of nail conveyors, a distributer, and means for receiving nails from the plural conveyors, inverting them and delivering them to the distributer.

2. In a nail distributing machine, the combination, of a plurality of raceways, a distributer cylinder and means for receiving nails from the raceways, inverting them and delivering them to the distributer cylinder.

3. In a distributing machine, the combination with a fastener-supplying means, of means constructed and arranged to receive simultaneously a plurality of series of fasteners from said supplying means and to invert each fastener of each series.

4. In a nail distributing machine, the combination of a plurality of raceways, a plurality of distributer disks arranged adjacent to the raceways in position to receive nails therefrom, and a distributer cylinder arranged adjacent to the disks in position to receive nails therefrom.

5. In a nail distributing machine, the combination of a plurality of raceways, a plurality of distributer disks arranged one adjacent to each raceway in positions to receive nails from the raceways respectively, and a single distributer cylinder positioned to receive nails from all of said disks.

6. In a nail distributing machine, the combination of an inclined raceway, a distributer disk rotatable adjacent to the delivery end of the raceway and arranged to receive nails moving from said raceway in the direction of their length, and a distributer cylinder arranged to receive nails from the disk.

7. In a nail distributing machine, the combination of a nail conveyor, a nail separating device co-operating therewith, a rotatable distributer arranged to receive nails from the separating device, and a second rotatable distributer to which that first named delivers.

8. In a nail distributing machine, the combination of a plurality of inclined raceways, a plurality of vertically rotatable distributer disks at the delivery ends of the raceways, and a horizontally rotatable distributer cylinder located adjacent to the disks in position to receive nails therefrom.

9. In a distributing machine, the combination of a raceway, a separating device mounted at the end of the raceway, a reversing disk having radial recesses to receive articles separated from the raceway by said device and reverse them, and a plurality of cam members for operating the separating device, each cam member bearing a fixed relationship to one of the recesses in the disk.

10. In a distributing machine, the combination of a plurality of raceways, a separating device mounted at the end of each raceway, means to receive articles separated from each raceway by said device and reverse them, and a disk adjacent each raceway having a plurality of cam members for operating the corresponding separating device, to deliver a plurality of independent series of reversed articles.

11. In a nail distributing machine, the combination of a raceway, means for delivering nails from the raceway, means for reversing all the nails delivered, and movable controlling means co-operating with the delivery means and arranged to variably determine the number of nails to be delivered.

12. In a nail distributing machine, the combination of a raceway, means for delivering a variably predetermined number of nails from the raceway, a rotatable distributer arranged to receive the nails as they are delivered from the raceway, and a support fixed with relation to the rotation of the distributor and upon which the delivering means is movable.

13. In a nail distributing machine, the combination of a raceway, a vertically rotatable distributer disk, means for delivering a variably predetermined number of nails from the raceway to the disk, and a distributer cylinder arranged to receive the nails from the disk.

14. In a nail distributing machine, the combination of a plurality of raceways, and means for delivering an independently variable number of nails from each raceway and then reversing their position.

15. In a nail distributing machine, the combination of a raceway, a nail-separating device mounted at the end thereof, and means traveling past the separating device for operating said device to deliver a variably predetermined number of nails and then to reverse them.

16. In a nail distributing machine, the combination of a plurality of raceways, a plurality of distributer members arranged to receive nails from the raceways, and means for delivering a variably predetermined number of nails from the raceways to the distributer members.

17. In a nail distributing machine, the combination of a plurality of raceways, a plurality of distributer members arranged to receive nails from the respective raceways, means for delivering nails from the raceways to the distributer members, and means for variably predetermining the numbers of nails delivered to the respective distributer members.

18. In a nail distributing machine, the combination of a plurality of raceways, a distributer disk adjacent to the delivery end of each raceway, a nail separator at the delivery end of each raceway, and means for actuating the respective separators independently, variably predetermined numbers of times to deliver corresponding numbers of nails from the raceways to the respective distributer disks.

19. In a nail distributing machine, the combination of a raceway, a rotary distributer member adjacent to the delivery end of the raceway, a nail separator in cooperative relation to the raceway, and means for simultaneously imparting a complete rotation to the distributer member and actuating the separator a variably predetermined number of times.

20. In a nail distributing machine, the combination of a raceway, a movable distributer member adjacent to the delivery end of the raceway, said member being provided with a series of nail receiving holes, means for moving said member to present all of said holes in succession to the end of the raceway, a separator delivering from the raceway to the holes of the distributor, and means for operating the separator a variably predetermined number of times for each movement of the distributor member.

21. In a nail distributing machine, the combination of a raceway, a rotary distributer disk adjacent to the delivery end of the raceway, said disk being provided with a series of radial nail receiving holes, means for imparting a single rotation to the disk, and a device operable a plurality of times for each rotation of the disk for delivering to the holes from the raceway a variably predetermined number of nails.

22. A nail feed mechanism, the same comprising a series of independently longitudinally movable spring held aligned nail picks, means for successively feeding nails thereto, and a series of aligned rotary means constructed and arranged so as to permit adaptation thereof for selectively actuating the nail picks in various desired timed relations.

23. A nail feed mechanism for the described purpose, the same comprising a plurality of independently longitudinally movable aligned spring held nail picks, and a plurality of aligned rotary actuating means associated with and adapted to selectively actuate the nail picks in timed relation.

24. A nail feed mechanism for the described purpose, the same comprising in combination an aligned series of nail strippers, and an aligned series of longitudinally disposed nail picks associated with said strippers for successively cutting out and removing the lowermost nail of the series of nails contained within the nail strippers, and a series of independent nail pick actuating devices associated with the nail picks and constructed and arranged so as to permit adaptation thereof for selectively actuating the said nail picks in various timed relations, and means for imparting uniform rotary movement to the said series of aligned nail pick actuating devices.

25. A nail feed mechanism, the same comprising, in combination, a plurality of nail strippers each adapted to hold a line of suspended nails, a plurality of spring held nail picks associated with the nail strippers for removing the lowermost nail of said line of nails suspended within said strippers and a plurality of rotary aligned devices associated with the nail picks for the selective actuation thereof at timed intervals and adapted for operating said nail picks in timed relation with one another.

26. A nail feed mechanism for the described purpose, the same comprising in combination a plurality of longitudinally disposed spring held aligned nail picks, a series of longitudinally disposed aligned rotary means constructed and arranged to permit adaptation thereof for selectively actuating the nail picks in various timed relations, and a drive shaft for imparting rotary motion to the nail pick actuating means.

27. A nail feed mechanism for the described purpose, the same comprising in combination a plurality of longitudinally disposed spring held nail picks, a plurality of aligned nail pick actuating devices mounted for rotary movement and constructed and arranged so as to permit adaptation thereof for selectively actuating the nail picks in various desired timed relation, and means for imparting rotary movement simultaneously to the said pick actuating devices.

28. A nail feed mechanism for the described purpose, the same comprising a plurality of aligned nail strippers, a plurality of longitudinally movable spring held nail picks associated with said nail strippers, a plurality of rotary aligned actuating means for the nail picks, a drive shaft for said means, mechanism for imparting rotation to the drive shaft, and devices associated with the rotary actuating means for adapting the same to actuate the aligned nail picks selectively in timed relation.

29. A nail feed mechanism, the same comprising a series of independently longitudinally movable spring held alined nail separators, means for successively feeding nails thereto, and a series of alined rotary means constructed and arranged so as to permit adaptation thereof for variably actuating the separators independently of one another.

30. A nail feed mechanism for the described purpose, the same comprising in combination a plurality of nail separators, a plurality of alined separator actuating devices mounted for rotary movement and constructed and arranged so as to permit adaptation thereof for differently actuating the separators independently of one another, and means for imparting rotary movement simultaneously to the said separator actuating devices.

31. In a distributing machine, the combination of a raceway, a separating device at the end of the raceway, and a rotary device carrying members constructed and arranged to operate the separating device and to be varied in position to render effective for such operation different members.

32. In a distributing machine, the combination of a plurality of raceways, a separating device adjacent each raceway, and means for variably operating said separating devices individually, said means being constructed and arranged to be varied to vary independently its operation on different separating devices.

33. In a distributing machine, the combination of a plurality of raceways, a separating device adjacent each raceway, a shaft extending transversely across the ends of the raceways, and an operating member on the shaft adjacent each raceway, each operating member carrying a series of projecting pins for operating the separating device.

34. In a distributing machine, the combination of a plurality of raceways, a separator movable transversely of each raceway and a cam arm for each separator, a shaft transversely across the front of the raceways, an actuator mounted on the shaft adjacent each raceway, and a plurality of projecting devices on each actuator successively to engage the corresponding cam arm to operate the separator.

35. In a distributing machine, the combination of a raceway, a separator movable transversely of the raceway and a cam arm therefor, a shaft transversely across the raceway, an actuator mounted on the shaft adjacent the raceway, and a variable number of projecting devices on the actuator successively to engage the cam arm to operate the separator.

36. In a distributing machine, the combination of a raceway, a separator therefor carrying a cam arm, a rotary shaft adjacent the raceway, and a plurality of radially-projecting cam arm operators on the shaft.

37. In a distributing machine, the combination of a raceway, a separator therefor carrying a cam arm, an angularly-movable device, and a variable number of radially-projecting cam arm operators carried by said device.

38. In a nail distributing machine, the combination of a raceway, a nail separator, an actuator for the separator including a plurality of pins arranged to impart a series of movements to the separator, and means for withdrawing any desired number of said pins from operative position.

39. In a nail distributing machine, the combination of a raceway, a nail separator, an actuator for the separator including a plurality of pins arranged to impart a series of movements to the separator, and cam means for placing any desired number of said pins in operative position.

40. In a nail distributing machine, the combination of a movable distributer member, a rigid, stationary guard member, and a yielding shutter in the guard member to permit the passage of a nail projecting from the distributer member.

41. In a nail distributing machine, the combination of a rotary distributer member having nail receiving holes in its periphery, a rigid guard member close to the periphery of the distributer member, and a yielding shutter in the guard member in the path of any nail which may project from a hole in the distributer member.

42. In a nail distributing machine, the combination of a cylindrical distributer member having nail guiding passages opening upon the periphery of the cylinder, and a detachable casing for completing the walls of the passages, said casing consisting of a flexible band of thin material.

43. In a nail distributing machine, the combination of a cylindrical distributer member having nail guiding passages opening upon the periphery of the cylinder, a detachable casing for completing the walls of the passages, said casing consisting of a flexible band of thin material, and binding means for securing the casing in place.

44. In a nail distributing machine, the combination of a distributer member, a second distributer member, and means for normally maintaining the second member in position to receive nails from the first member, said means being constructed and arranged to permit the members to be easily separated manually to afford access thereto.

45. In a nail distributing machine, the combination of a distributer member, a distributer cylinder beneath the member, and means for normally maintaining the cylinder in position to receive nails from the member, constructed and arranged to permit the cylinder to be lowered away from the member manually to afford easy access to the cylinder.

46. In a nail distributing machine for collar nails, the combination of a raceway, and a stop arranged to engage the lowermost nail while it is in the raceway, comprising a member for engaging the shank portion of the nail, below the collar, a member for engaging the head portion of the nail, and means for adjusting the spacing of said members.

47. In a nail distributing machine for collar nails, the combination of a raceway, and a stop arranged to engage the lowermost nail while it is in the raceway, comprising members having faces in the same vertical plane for engaging respectively the shank and head portions of the nail, and means for effecting relative vertical adjustment between said members.

48. In a nail distributing machine, the combination of a member provided with a nail guiding passage, a relatively movable cover member, and means separate from said cover member rendered inoperative by relative approaching movement of said members for closing the passage when the members are separated.

49. In a nail distributing machine, the combination of adjacent, separable members co-operating to form a normally open nail guiding passage, and means separate from said members movable transversely of the passage for automatically closing the passage when said members are separated.

50. In a nail distributing machine, the combination of a member provided with a partially inclosed nail guiding passage, a cover member pivoted thereto and co-operating to complete the passage, and yieldingly actuated means retracted by relative approaching movement of said members for closing the passage transversely when the members are separated.

51. In a nail distributing machine, the combination of a plurality of inclined raceways, a member mounted below the ends of the raceways and formed with portions of a corresponding plurality of chutes to receive nails from the raceways, an end block formed to complete the several chutes, a nail retainer adjacent each raceway and its chute, and means to operate the several retainers when the end block is removed from its place.

52. In a nail distributing machine, the combination of a plurality of raceways each including an inclined portion, a vertical chute portion, co-operating with each raceway, an end block movable to afford access to the chute portions, and a spring-pressed nail retainer adjacent each raceway and held inoperative by engagement with the end block, said retainers moving to close the raceways when the end block is removed.

53. In a nail distributing machine, the combination of a plurality of nail guides, each including an inclined portion or raceway and a vertical portion or chute, a movable end block for closing the chute portions of all the nail guides and for affording convenient access thereto, and means for simultaneously blocking all the nail guides to prevent loss of nails when the end block is removed from its place.

54. In a nail distributing machine, the combination of a plurality of nail guides, each including an inclined portion or raceway and a vertical portion or chute, separating means for delivering nails from the inclined portions to the vertical portions of the guides, a movable end block for closing the chute portions of all the nail guides and for affording convenient access thereto, and a plurality of members, one adjacent each nail guide, simultaneously movable to block all the nail guides to prevent loss of nails when the end block is removed from its place.

In testimony whereof I have signed my name to this specification.

JOHN M. BENJAMIN.